United States Patent
Nowakowski et al.

(10) Patent No.: US 10,469,797 B2
(45) Date of Patent: *Nov. 5, 2019

(54) AUTOMATIC ADJUSTMENT OF VIDEO ORIENTATION

(71) Applicant: Google Inc., Zurich (CH)

(72) Inventors: Maciek S. Nowakowski, Zurich (CH); Balazs Szabo, Oberrieden (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,403

(22) Filed: Sep. 11, 2017

(65) Prior Publication Data

US 2017/0374314 A1    Dec. 28, 2017

Related U.S. Application Data

(63) Continuation of application No. 13/838,686, filed on Mar. 15, 2013, now Pat. No. 9,762,848.

(51) Int. Cl.
*H04N 7/01* (2006.01)
*H04N 5/232* (2006.01)
*H04N 5/262* (2006.01)

(52) U.S. Cl.
CPC ....... *H04N 7/0117* (2013.01); *H04N 5/23251* (2013.01); *H04N 5/23254* (2013.01); *H04N 5/2628* (2013.01)

(58) Field of Classification Search
None
See application file for complete search history.

(56) References Cited

U.S. PATENT DOCUMENTS

| | | | |
|---|---|---|---|
| 6,292,215 B1 | 9/2001 | Vincent | |
| 7,656,428 B2 | 2/2010 | Trutna, Jr. | |
| 8,259,184 B2 | 9/2012 | Murashima et al. | |
| 8,289,401 B2 | 10/2012 | Pinto et al. | |

(Continued)

FOREIGN PATENT DOCUMENTS

| | | |
|---|---|---|
| CN | 1647110 A | 7/2005 |
| CN | 1979322 A | 6/2007 |

(Continued)

OTHER PUBLICATIONS

International Searching Authority, "Notification of Transmittal of the International Search Report and the Written Opinion of the International Search Authority, or the Declaration," for International Application No. PCT/US2014/029579, dated Jul. 17, 2014, 11 pages.

(Continued)

*Primary Examiner* — Yi Wang
(74) *Attorney, Agent, or Firm* — Lowenstein Sandler LLP

(57) ABSTRACT

Methods, systems and computer program products for automatic adjustment of video orientation are provided. A computer-implemented method may include receiving a video comprising a plurality of image frames, determining that shaking of a mobile device has occurred during recording of the video, determining a baseline alignment for the video, adjusting the video in view of the baseline alignment, and providing a user interface comprising the video player to present a preview of the adjusted video to a user on the mobile device.

17 Claims, 5 Drawing Sheets

(56) References Cited

U.S. PATENT DOCUMENTS

| | | | |
|---|---|---|---|
| 2003/0099395 A1 | 5/2003 | Wang et al. | |
| 2004/0179104 A1 | 9/2004 | Benton | |
| 2004/0247178 A1 | 12/2004 | Reese | |
| 2005/0093891 A1 | 5/2005 | Cooper | |
| 2005/0212931 A1 | 9/2005 | Gallagher et al. | |
| 2009/0034866 A1 | 2/2009 | Park et al. | |
| 2009/0046204 A1 | 2/2009 | Kim et al. | |
| 2010/0039548 A1 | 2/2010 | Sakai | |
| 2010/0103311 A1 | 4/2010 | Makii | |
| 2011/0032384 A1 | 2/2011 | Ono | |
| 2011/0228098 A1 | 9/2011 | Lamb et al. | |
| 2012/0140092 A1 | 6/2012 | Nourbakhsh et al. | |
| 2012/0206565 A1 | 8/2012 | Villmer | |
| 2012/0236029 A1 | 9/2012 | Newhouse et al. | |
| 2013/0073775 A1* | 3/2013 | Wade | G06F 13/4022 710/316 |
| 2013/0136379 A1 | 5/2013 | Zheng et al. | |
| 2013/0207999 A1 | 8/2013 | Hagiwara | |
| 2014/0140677 A1* | 5/2014 | Cho | H04N 5/772 386/230 |
| 2014/0146205 A1 | 5/2014 | Xu et al. | |
| 2014/0267806 A1 | 9/2014 | Kennedy et al. | |
| 2016/0006930 A1 | 1/2016 | Voss | |

FOREIGN PATENT DOCUMENTS

| | | |
|---|---|---|
| CN | 101930302 A | 12/2010 |
| EP | 1500045 A1 | 1/2005 |
| EP | 2160019 A1 | 3/2010 |
| JP | 2002-158959 | 5/2002 |
| JP | 2002-158959 A | 5/2002 |
| JP | 2005-229394 | 8/2005 |
| JP | 2005-229394 A | 8/2005 |
| JP | 2005-523596 | 8/2005 |
| JP | 2005-523596 A | 8/2005 |
| JP | 2009-033223 | 2/2009 |
| JP | 2009-033223 A | 2/2009 |
| JP | 2010-016548 | 1/2010 |
| JP | 2010-016548 A | 1/2010 |
| JP | 2010-045733 | 2/2010 |
| JP | 2010-045733 A | 2/2010 |
| JP | 2011-259342 | 12/2011 |
| JP | 2012-124939 | 6/2012 |
| JP | 2012-124939 A | 6/2012 |
| KR | 20070070848 A | 7/2007 |
| WO | 03/088147 A1 | 10/2003 |
| WO | 03088147 | 10/2003 |
| WO | 2013078539 A1 | 6/2013 |

OTHER PUBLICATIONS

Karpenko et al., "Digital Video Stabilization and Rolling Shutter Correction Using Gyroscopes", 7 pages, Stanford Tech Report CTSR 2011-03.

Hanning, et al., "Stabilizing Cell Phone Video Using Inertial Measurement Sensors", 8 pages, http://www.liu.se/forskning/foass/per-erik-forssen/VGS.

Chinese Patent Application No. 201480016187.2 Office Action dated Dec. 22, 2017, 24 pages.

Japanese Patent Application No. 2016-503148 Office Action dated Feb. 19, 2018, 14 pages.

Japanese Patent Application No. 2016-503148 Office Action dated May 11, 2018, 23 pages.

\* cited by examiner

AUTOMATIC ADJUSTMENT OF VIDEO ORIENTATION

CROSS-REFERENCE TO RELATED APPLICATIONS

This application is a continuation of co-pending U.S. patent application Ser. No. 13/838,686, filed on Mar. 15, 2013, which is herein incorporated by reference.

TECHNICAL FIELD

The field generally relates to video images and more specifically to the presentation of video images.

BACKGROUND

Many websites allow users to share videos with others around the world. In addition, technological advancements also have made it increasingly convenient for users to capture and share their own video content. For example, smartphones having one or more high-quality digital cameras, gyroscopic sensors, abundant storage space, and mobile broadband allow users to flexibly record and share videos from virtually anywhere.

However, user generated videos may be captured from a variety of different orientations, which can result in the incorrect display of video content. For example, a user may inadvertently or mistakenly rotate a recording device while capturing a video. As a result, one or more portions of the video may be displayed sideways or upside down. Further, a user may not become aware of such a result until a video is later presented on a fixed display.

SUMMARY

Embodiments generally relate to the adjustment and correction of video images. In one embodiment, a computing device receives a video comprising a plurality of image frames and detects an orientation change in the video. The computing device then determines a standard orientation for the video and adjusts the video to the standard orientation by resizing one or more of the image frames in the video and rotating one or more of the image frames in the video to the standard orientation.

In another embodiment, a computer-readable storage medium has instructions recorded thereon, that when executed by a processor, cause the processor to perform operations. The instructions include computer-readable program code configured to cause the processor to receive a video comprising a plurality of image frames, detect an orientation change in the video, determine a standard orientation for the video, and adjust the video to the standard orientation by resizing one or more of the image frames and by rotating one or more of the image frames to the standard orientation.

In a further embodiment, a system includes a memory and a processing device coupled to the memory that is configured to receive a video comprising a plurality of image frames, detect an orientation change in the video, determine a standard orientation for the video, and adjust the video to the standard orientation by resizing one or more of the image frames and by rotating one or more of the image frames to the standard orientation.

Further embodiments, features, and advantages of the disclosure, as well as the structure and operation of the various embodiments of the disclosure are described in detail below with reference to accompanying drawings.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION

Figure 1:
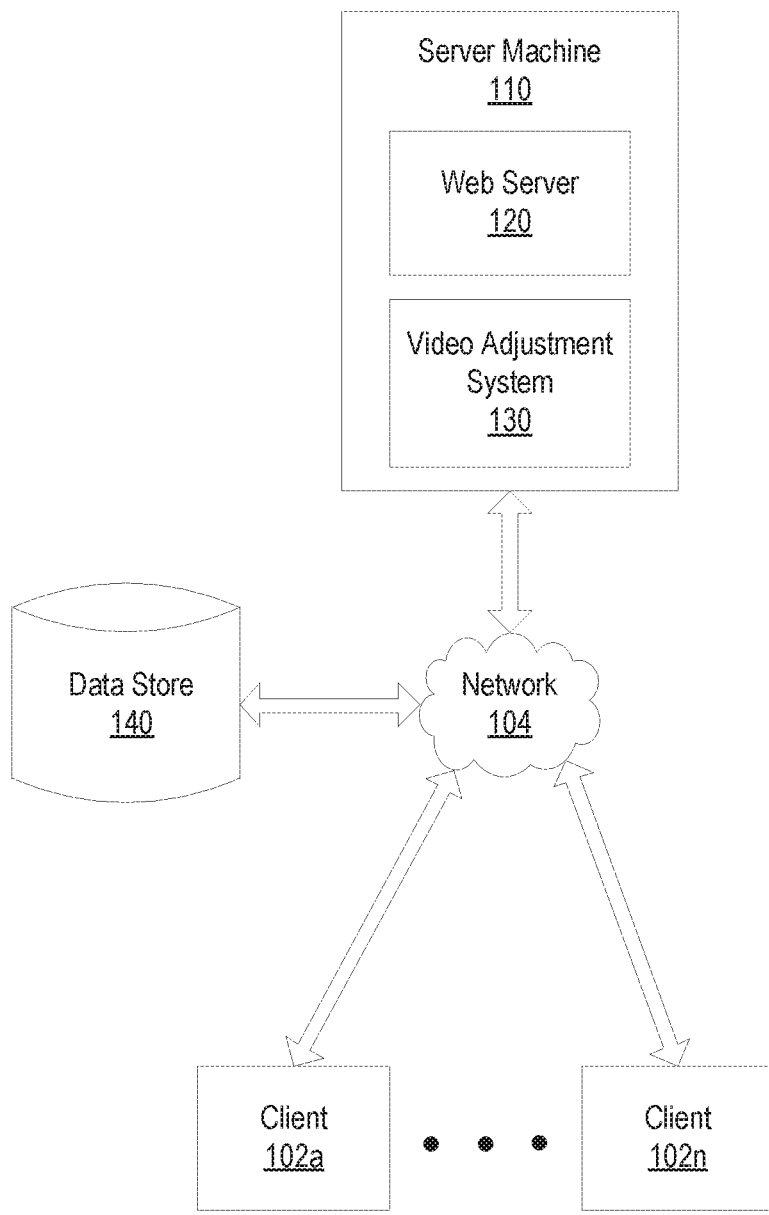
FIG. 1 illustrates an exemplary system architecture, in accordance with various embodiments of the present disclosure.

Millions of user-generated videos are shared on the Internet each day. Many of these videos have been recorded on mobile devices, such as smart phones and digital cameras. In addition, many of these devices are equipped with one or more sensors, such as gyroscopes and accelerometers, which capture orientation and positioning of a device.

While mobile devices offer users convenience and flexibility in capturing and sharing their own videos, it is very easy to inadvertently move or rotate a mobile device when recording a video. As a result, one or more portions of a video may be captured from an incorrect orientation. In addition, one or more portions of a video also may contain unintended shaking and/or movement. However, a user is not typically aware of the unintended result until a video is played back at a later time, for example, on a fixed display such as a computer monitor.

In one example, a user may capture a video using a smartphone. The user then may upload the video to a video sharing or social networking website. The user then may preview the uploaded video before sharing it, for example, either publicly or privately. During the preview, the user may discover that multiple segments of the video have been captured from one or more incorrect orientations. For example, different portions of the video may be displayed sideways, upside-down and/or at an angle. To correct the video, the user should transfer the video content to a system with video editing software and manually adjust one or more segments of the video. The user then should upload the manually corrected video to the website. Thus, the detection and correction of orientation changes in user-captured video content are both inconvenient and burdensome to users.

Embodiments of the present disclosure address the above deficiencies by adjusting video content to correct segments of a video that have been captured from one or more incorrect orientations. Detection and correction of misoriented video content may be performed automatically so that a user does not need to perform manual correction using a video editing software tool.

For example, a user may upload a video from a mobile device to a video sharing website providing automatic adjustment of video content. The website may analyze positional and/or orientation data associated with image frames from the video to detect that one or more orientation changes, shaking, and/or excessive movement occur in the video. The website may notify the user of the condition, may allow the user to preview the video, and may allow the user to select a standard orientation and/or baseline alignment that will be used to correct the video. The website then may correct the video so that the orientation of each video frame is consistent with the standard orientation and/or baseline alignment selected by the user. The user then may view and share the corrected video without having to manually adjust video image frames using a video editing tool. Thus, the video adjustment system may automatically detect and correct video content recorded in one or more different orientations at various times throughout an entire video. The video adjustment system also may detect and correct shaking and movement detected at various times throughout a video. Further, the adjustment may be applied to one or more video image frames to produce an adjusted video that is displayed, for example, consistently in a single fixed, standard orientation and/or position.

FIG. 1 illustrates an exemplary system architecture, in accordance with various embodiments of the present disclosure. The system architecture 100 includes a server machine 110, a data store 140 and client machines 102A-102N connected to a network 104. Network 104 may be a public network (e.g., the Internet), a private network (e.g., a local area network (LAN) or wide area network (WAN)), or a combination thereof.

Data store 140 is persistent storage that is capable of storing various types of data, such as video and image content. In some embodiments data store 140 might be a network-attached file server, while in other embodiments data store 140 might be some other type of persistent storage such as an object-oriented database, a relational database, and so forth. Data store 140 may include user generated content (video and/or image content) that is uploaded by client machines 102A-102N. The data may additionally or alternatively include content provided by one or more other parties. Image and video content may be added to data store 140 as discrete files (e.g., motion picture experts group (MPEG) files, windows media video (WMV) files, joint photographic experts group (JPEG) files, graphics interchange format (GIF) files, portable network graphics (PNG) files, etc.) or as components of a single compressed file (e.g., a zip file).

In an embodiment, data store 140 is used to store video and image content comprising position and/or orientation metadata. In another embodiment, data store 140 stores one or more of video and image content, and position and/or orientation metadata that is associated or linked to the video and image content.

The client machines 102A-102N may be personal computers (PC), laptops, mobile phones, tablet computers, a camera, or any other computing device. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may display video content and other visual media provided by a web server and may allow editing of videos and other visual media.

Server machine 110 may be a rackmount server, a router computer, a personal computer, a portable digital assistant, a mobile phone, a laptop computer, a tablet computer, a camera, a video camera, a netbook, a desktop computer, a media center, or any combination of the above. Server machine 110 may include a web server 120 and a video adjustment system 130. In alternative embodiments, the web server 120 and video adjustment system 130 may run on one or more different machines.

Web server 120 may serve video content from data store 140 to clients 102A-102N. Clients 102A-102N may locate, access and view video content from web server 120 using a web browser. Web server 120 also may receive video content from clients 102A-102N that is saved in data store 140 for purposes that may include preservation and distribution.

Web server 120 may receive queries for video content and perform searches for video content using data store 140 to locate video data satisfying the search queries. Web server 120 may then send to a client 102A-102N video data results matching the search query. In one embodiment, web server 120 provides an application configured to allow clients 102A-102N to upload, preview, edit, display and publish video content. For example, web server 120 may include or access one or more applications providing such functionality. In one example, web server 120 communicates with one or more application servers that may be hosted with or hosted apart from web server 120 on one or more server machines 110. Such functionality also may be provided, for example, by one or more different web applications, stand-alone applications, systems, plugins, web browser extensions, and application programming interfaces (APIs).

A video is a set of sequential image frames representing a scene in motion. For example, a series of sequential images may be captured continuously or later reconstructed to produce animation. Video content may be presented in various formats including, but not limited to, analog, digital, two-dimensional and three-dimensional video. Further, video content may include movies, video clips or any set of animated images to be displayed in sequence.

Video adjustment system 130 may analyze video content to determine whether one or more orientation changes are present in the video content. For example, the video adjustment system 130 may analyze orientation information associated with one or more video image frames. The orientation information may include, for example, a specific position and/or orientation of a recording device at the moment when a video image frame is/was captured. For example, a video recording device may include one or more sensors, such as gyroscopic sensors and/or accelerometers that measure orientation and/or position of the device. The video recording device may receive and store such measurements from the one or more sensors as metadata within corresponding video image frames. In another example, measurements such as position and/or orientation data that are associated with one or more video image frames may be stored apart from the video image frames and may be associated/referenced at a later time.

In one embodiment, video adjustment system 130 may determine whether a series of video image frames associated with a video uploaded by a client 102A-102N have been recorded from multiple orientations. Video adjustment system 130 also may perform automatic adjustment of video content to correct one or more changes in video image frame orientation occurring throughout a video.

In an embodiment, web server 120 provides a web application to clients 102A-102N, which may reside on one or more server machines 110. The web application may include a graphical user interface configured to allow users to upload, display and manage video content. The web application also may include or utilize a video adjustment system 130. In one embodiment, the video adjustment system 130 may analyze video content during an upload process automatically based on one or more of a system setting, user preference, user request, or default. Video content analysis also may be performed by video adjustment system 130, for example, based on a user request received after the video content has been uploaded to a data store 140. A user may initiate a request, for example, using one or more commands (e.g., voice, text, motion) or by performing one or more actions/interactions with the graphical user interface (e.g., button click, keyboard shortcut).

In one embodiment, video adjustment system 130 determines that video content has been recorded in multiple orientations and provides a corresponding indication to a user (e.g., content owner, content administrator, content viewer). The web application may notify the user about the condition using a graphical user interface. For example, the web application may display a message or alert, update a label, redirect or refresh the interface, and/or provide one or more additional selectable controls (e.g., preview video orientation correction button, perform video orientation correction button).

In an embodiment, the graphical user interface is configured to allow a user to initiate video orientation correction, preview a full or sample version of adjusted video content with a proposed correction, save adjusted video content, and replace existing video content with adjusted video content. The graphical user interface also may be further configured to allow a user to preview adjusted/corrected video content (e.g., sample clip, full-version) with corresponding original video content. For example, adjusted video content may be played simultaneously and alongside original video content to allow side-by-side comparison. In one embodiment, a full or sample version of adjusted video content having a proposed corrected orientation is automatically generated and available for preview upon user request.

Figure 2:
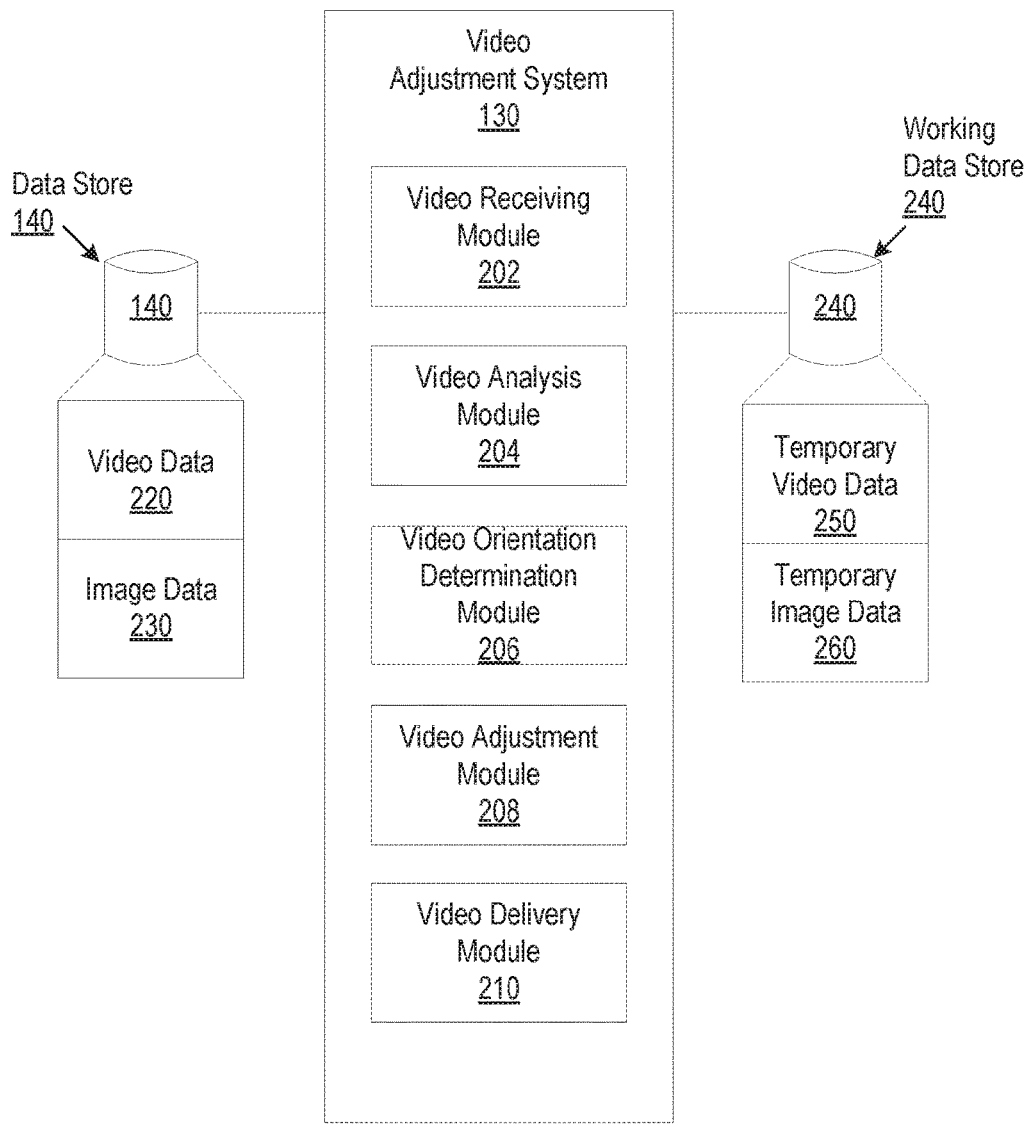
FIG. 2 is a block diagram of a video adjustment system, in accordance with an embodiment.

FIG. 2 is a block diagram of a video adjustment system 130, in accordance with an embodiment of the present disclosure. The video adjustment system 130 includes a video receiving module 202, a video analysis module 204, a video orientation determination module 206, a video adjustment module 208, and a video delivery module 210. In other embodiments, functionality associated with one or more of video receiving module 202, video analysis module 204, video orientation determination module 206, video adjustment module 208, and video delivery module 210 may be combined, divided and organized in various arrangements.

In an embodiment, video adjustment system 130 is coupled to data store 140 and working data store 240. Data store 140 includes video data 220 and image data 230. Working data store 240 includes temporary video data 250 and temporary image data 260.

Video data 220 generally refers to any type of moving image, which includes, but is not limited to movie films, videos, digital videos and other forms of animated drawings or display. For example, video data 220 may include digital videos having a sequence of static image frames that may be stored as image data 230. Thus, each image frame may represent a snapshot of a scene that has been captured according to a time interval.

Video data 220 may include computer animations, including two-dimensional and three-dimensional graphics. Video data 220 also may include any sequence of images, including graphical drawings that create an illusion of movement.

Image data 230 generally refers to any projection of real space through a lens onto a camera sensor. Image data 230 includes, but is not limited to, any type of two-dimensional image, three-dimensional image, video content and/or drawing.

In an embodiment, video adjustment system 130 utilizes working data store 240 as temporary storage space to perform adjusting of video data 220 and image data 230. Working data store 240 may include, for example, any type or combination of volatile and non-volatile storage (e.g., disk, memory).

In one embodiment, working data store 240 contains temporary video data 250 and temporary image data 260. For example, temporary video data 250 may include one or more copies of video data 220, such as original and modified/adjusted versions. Further, temporary image data 260 may include one or more copies of image data 230, such as original and modified/adjusted video image frames.

Working data store 240 also may include temporary data and results produced by video adjustment system 130. For example, working data store 240 may include original video content, original video image frames, corrected video image frames, and adjusted video content.

Further, video adjustment system 130 may use working data store 240, for example, to perform adjustment calculations, to persist intermediate processing results, and to provide adjusted video content having corrected video orientation to users.

Video receiving module 202 receives video content from one or more sources. For example, video receiving module may receive video content that includes a plurality of video image frames on a server machine 110 or a client device 102A-102N, such as a camera or a smartphone. In one example, video receiving module 202 receives video content that has been recorded and stored directly on the same computing device. In another example, video receiving module 202 receives video content from another source, such as an external video recording device, a different client 102A-102N, or a server machine 110.

In an embodiment, video analysis module 204 analyzes video data 220 and/or image data 230 to determine when a series of video image frames associated with video content have been recorded from one or more different orientations. For example, visual analysis module 204 may read and compare positional and/or orientation-based metadata associated with one or more video image frames. The video analysis module 204 may, for example, compare position and/or orientation metadata between and/or across multiple video image frames to determine whether orientation changes, shaking, and/or movement occur in the video content.

In one embodiment, video analysis module 204 detects a change in video orientation based on a threshold. For example, a threshold may be defined to specify a degree of rotation between two or more video image frames that will be considered an orientation change. The threshold may be provided, for example, as a user preference, system setting or default value.

Video orientation determination module 206 determines a standard orientation for the video content. In one embodiment, an original orientation of a video may be determined as the standard orientation. The standard orientation for a video also may be determined based on the most common orientation detected throughout the video, a user preference, a user selection, or orientation and/or size of a display device/video player where the video is to be displayed.

Video adjustment module 208 performs adjustment and resizing of one or more video image frames in a video. For example, video adjustment module 208 may calculate a degree of rotation required to adjust a video image frame from a non-standard orientation to the standard orientation determined for a video. The degree of rotation may be calculated, for example, based on the difference between orientation of a video image frame and the standard orientation. The video adjustment module 208 then may adjust the video image frame to the standard orientation based on the calculated degree of rotation. In addition, video adjustment module 208 also may resize video image frames. For example, video adjustment module may extend resolution of video image frames and/or crop video image frames to provide a uniform video image display size throughout an adjusted video.

Video delivery module 210 generates an adjusted video in the standard orientation. In an embodiment, video delivery module 210 generates an adjusted video in the standard orientation using a set of adjusted video frames received from video adjustment module 208. Video delivery module 210 then may provide the adjusted video in the standard orientation to a user for display.

Figure 3:
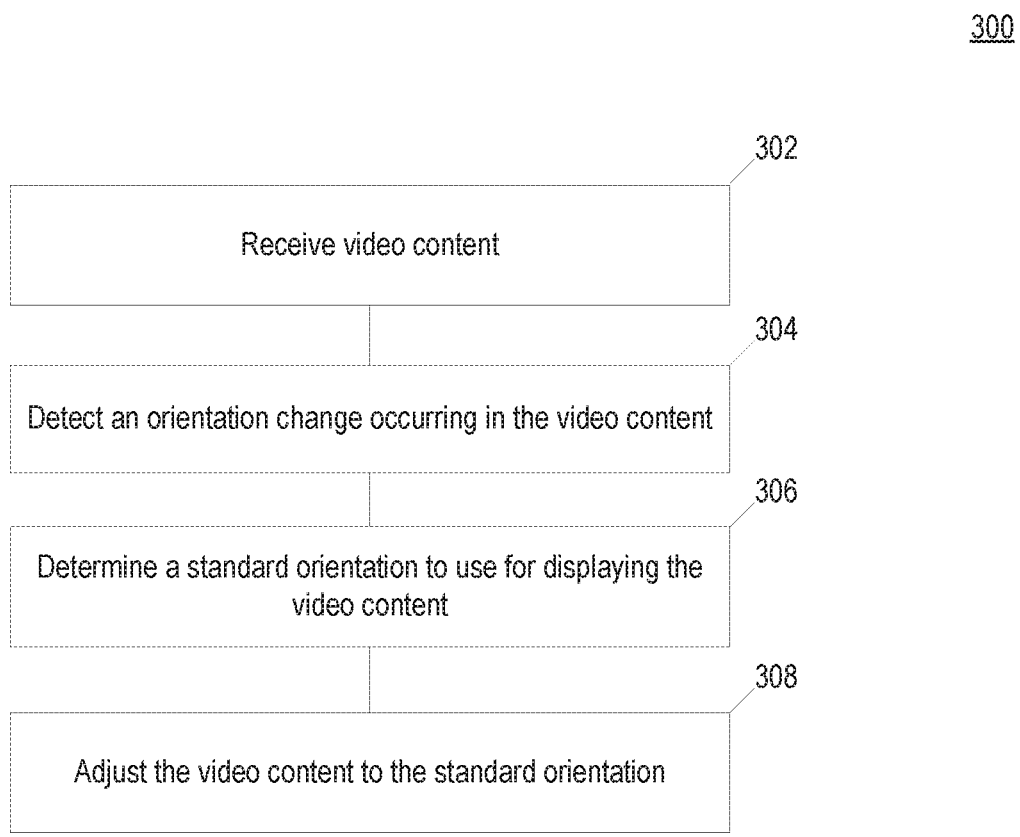
FIG. 3 is a flow diagram illustrating automatic adjustment of video orientation, according to an embodiment.

FIG. 3 is a flow diagram illustrating automatic adjustment of video orientation, according to an embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the server machine 110 of FIG. 1. The method 300 may be performed by video adjustment system 130 running on server machine 110 or one or more other computing devices.

Method 300 begins at stage 302, when video content is received. In an embodiment, video receiving module 202 receives video content that includes a plurality of video image frames. For example, video receiving module 202 may receive video content that has been recorded and stored on the same computing device. In another embodiment, video receiving module 202 may receive video content from another source, such as a different computer system.

At stage 304, an orientation change occurring in the video content is detected. In an embodiment, video analysis module 204 analyzes video image frames from video content received at stage 302. For example, video analysis module may analyze position and/or orientation metadata stored within video image frames to determine when an orientation change has occurred in a video.

For example, a video recording device may include and continuously monitor device sensors, such as one or more gyroscopes, as video content is recorded. The video recording device then may store positional and/or orientation information received from one or more of the sensors in video image frames as metadata. In one embodiment, position and/or orientation data is captured continuously by a video recording device and stored in each respective video image frame as metadata. In another embodiment, only changes to position and/or orientation data are captured in the video image frames as metadata when the changes occur during video recordation.

In one embodiment, orientation data stored in one or more image frames may be compared to determine whether an orientation change has occurred in a video. For example, an orientation change may be detected when a single or cumulative difference in orientation between two or more video image frames exceeds one or more defined thresholds.

In another embodiment, orientation and/or position data associated with one or more video image frames may be compared to detect and correct shaking and/or other unintended or disruptive movement that occurs during a recorded video. In one example, orientation and/or position data associated with one or more video image frames is used to establish a baseline alignment (e.g., a standard orientation or another standard position). Video image frames that deviate from the established baseline alignment may be adjusted to the determined baseline alignment to correct shaking and/or other unintended or disruptive movement occurring across video image frames.

At stage 306 a standard orientation for displaying the video content is determined. In an embodiment, a standard orientation is a single, fixed orientation used to display video content. For example, a standard orientation may be determined based on the original orientation of a video, the most common orientation detected throughout a video, a user preferred playback orientation, a user selected orientation, orientation of a device or video player where video content is to be displayed, and/or one or more attributes of a video player that will display the video content (e.g., video player height, width, screen position, orientation, is fixed, is modifiable, etc.).

At stage 308, the video content is adjusted to the standard orientation. In an embodiment, video adjustment module 208 performs adjustment and resizing of one or more video image frames in a video. For example, video adjustment module 208 may calculate a degree of rotation required to adjust a video image frame from its original orientation to the standard orientation. Video adjustment module 208 also may resize video content to a standard display resolution.

In an embodiment, video adjustment module 208 determines a degree of rotation required to adjust a video image frame to the standard orientation. In one example, video adjustment module 208 calculates the difference between orientation of a recorded video frame and the standard orientation determined for a video. Video orientation module 208 then may adjust the video frame based on the determination to correct the variation.

In addition, video adjustment module 208 also may resize video image frames. For example, video adjustment module 208 may crop video image frames to provide a standard display size for an adjusted video and/or to fit a portion of a video image into a different orientation or playback window.

In an embodiment, video adjustment module 208 calculates a standard display size for a video based on the shortest sides of all video image frames. For example, a video with a landscape orientation resolution of 3000×2000 and a portrait orientation resolution of 2000×3000 would have a standard display size of 2000×2000. Thus, the middle 2000×2000 square regions of both 2000×3000 portrait orientation video image frames and 3000×2000 landscape orientation video image frames may be adjusted to a standard orientation and displayed together at a common display size of 2000×2000.

In one example, each 2000×3000 portrait orientation video image frame is cropped so that the middle 2000×2000 region is retained. The cropped portrait orientation video image frame then may be rotated, centered, and displayed with 3000×2000 landscape video frames in an adjusted video.

In another example, the middle 2000×2000 square of a 3000×2000 landscape orientation video image frame may be rotated, centered, and displayed with 2000×3000 portrait orientation video frames in an adjusted video.

In another embodiment, a video with an original 3000× 2000 landscape orientation resolution may be rotated to a 2000×3000 portrait orientation resolution. Further, 2000× 3000 portrait orientation video image frames in the video then may be rotated to match the orientation of the adjusted landscape image frames and resized to a 1500×2000 area to keep the aspect ratio.

Figure 4:
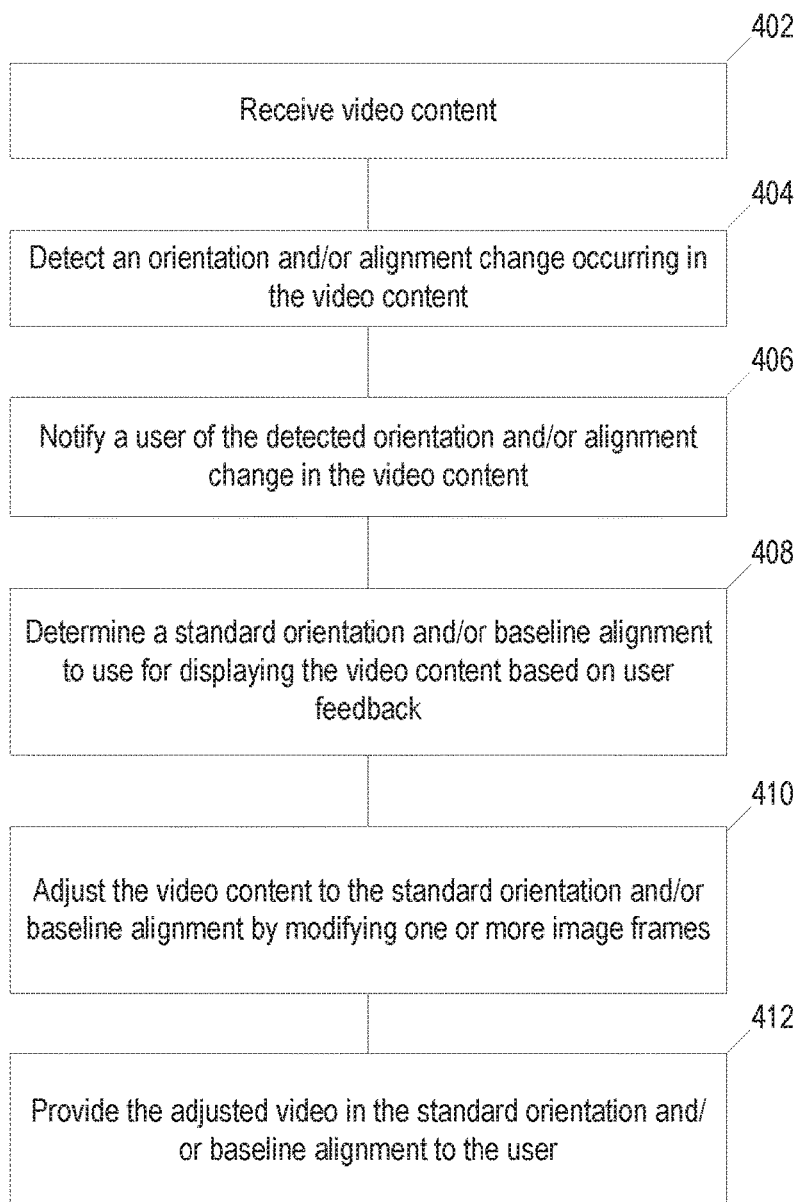
FIG. 4 is a flow diagram illustrating additional aspects of automatic adjustment of video content, according to an embodiment.

FIG. 4 is a flow diagram illustrating additional aspects of automatic adjustment of video content, according to an embodiment. The method 400 is performed by processing logic that may comprise hardware (circuitry, dedicated logic, etc.), software (such as is run on a general purpose computer system or a dedicated machine), or a combination of both.

At stage 402, video content is received. According to an embodiment, video content may be received or assembled from one or more sources. For example, video content may arrive as a single video file having a set of sequential image frames. Additionally, a video file may be assembled and/or created from two or more images having a sequential ordering or relationship. Stage 402 may be performed by, for example, video receiving module 202.

At stage 404, an orientation change and/or an alignment change (i.e., shaking or video image movement) is detected in the video content. In an embodiment, orientation and/or position data from two or more video image frames is analyzed and compared to determine when an orientation change and/or alignment change occurs in a video. In one example, an orientation change and/or an alignment change may be detected in a video when a change in orientation and/or position data between two or more video image frames exceeds a threshold. Stage 404 may be performed by, for example, video analysis module 204.

At stage 406, a user is notified of the detected orientation change and/or alignment change in the video content. In one embodiment, a user may receive a notification of a detected orientation change and/or alignment change on a device where the video content has been recorded. In another embodiment, a user may receive a notification from a video sharing or social networking website where the user has uploaded the video content. The notification provided to the user may indicate that camera rotation was detected in the video. In addition, the user may be provided with one or more of an option to preview the video, to preview one or more detected changes in orientation or alignment, and to automatically correct one or more detected orientation or alignment changes in the video. Further, the user may be prompted to select a standard orientation and/or baseline alignment for displaying the video. Stage 406 may be performed by, for example, video orientation determination module 206.

At stage 408, a standard orientation and/or baseline alignment to use for displaying the video content is determined based on user feedback. In one example, a standard orientation and/or baseline alignment are received based on user input that has been received. For example, a user may select a standard orientation and/or baseline alignment after being notified of a detected change in orientation and/or alignment in video content. The user also may select a standard orientation and/or baseline alignment after viewing a preview of the detected changes and/or other portions of the video content.

In other embodiments a standard orientation may be determined based on the original orientation and/or alignment of a video, the most common orientation or alignment detected throughout a video, a user preferred playback orientation, a user selected orientation/alignment, or orientation of a device or video player where video content is to be displayed. In an embodiment, adjustment of video content may be initiated automatically by video adjustment system 130, based on input received from a user, or based on a combination of both system and user input. Stage 408 may be performed by, for example, video orientation determination module 208.

At stage 410, the video content is adjusted to the standard orientation and/or baseline alignment by modifying one or more of the video image frames. In an embodiment, one or more of the image frames may be adjusted by rotating the image frames from a non-standard orientation to the standard orientation determined at stage 408. Further, one or more of the images frames also may be resized based on a standard video display size determined for an adjusted video.

In one embodiment, video image frames are resized by extending resolution of the video image frames to a square of the longest sides of the video. For example, a video with a landscape resolution of 3000×2000 and a portrait resolution of 2000×3000 may be extended to 3000×3000. Thus, the video image frames may be rotated to the standard orientation and displayed together in an adjusted video without losing content. Stage 410 may be performed by, for example, video adjustment module 208.

At stage 412, the adjusted video is provided to the user in the standard orientation and/or baseline alignment. The adjusted video may be generated based on the image frames that have been adjusted to a standard orientation and/or baseline alignment. The adjusted video content then may be presented to a user for preview or full display.

In an alternative embodiment, a video player or a video-playing website may not resize video image frames. Instead, the video image frames may be rotated to a standard orientation and displayed in an original size. For example, landscape video image frames of 600×400 may be displayed in their original size in a standard orientation. Portrait image frames of 400×600 then may be displayed in their original size in a standard orientation by resizing the video player area (and vice versa). In one example, content such as text surrounding the video player/video-playing area may be repositioned automatically one or more times when the video player area is automatically resized. Stage 412 may be performed by, for example, by video delivery module 210.

Figure 5:
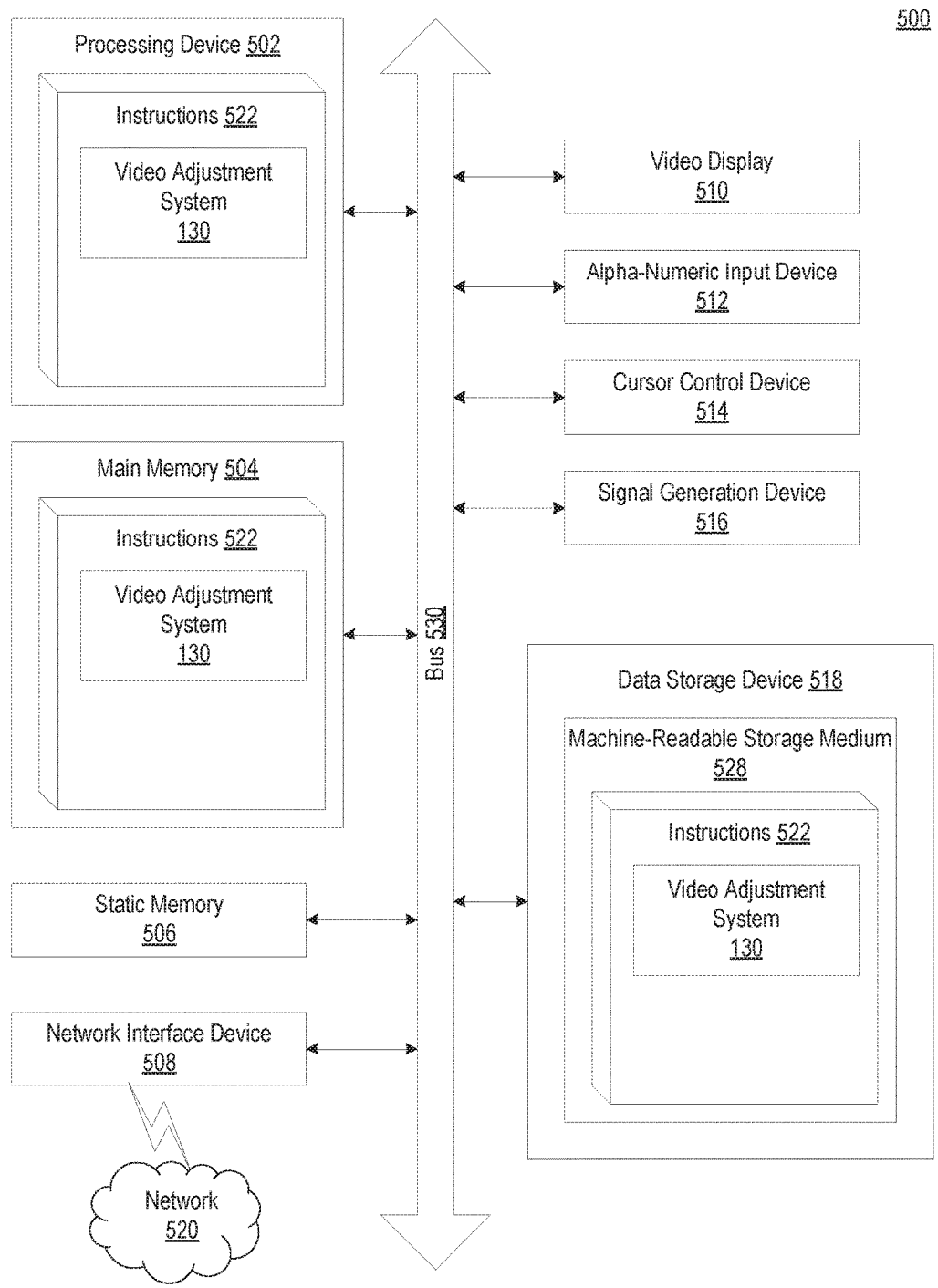
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), a network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a video adjustment module (e.g., video adjustment system 130 of FIG. 1) and/or a software library containing methods that call a video adjustment module. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking", "classifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
   receiving, by a processor of a mobile device of a user, a video recorded by a video recording device of the mobile device of the user, the video comprising a plurality of image frames;
   determining, by the processor of the mobile device, that shaking of the mobile device has occurred during recording of the video by the video recording device of the mobile device, wherein the shaking is determined for the video based on data stored by the video recording device of the mobile device for the plurality of image frames of the video recorded by the video recording device of the mobile device, the data comprising position information for a corresponding image frame of the video recorded by the video recording device of the mobile device, the position information being indicative of shaking;
   notifying the user of the shaking of the mobile device that occurred during the recording of the video;
   receiving, via a user interface, a user request to initiate an automatic correction of the video that was recorded by the video recording device of the mobile device that was shaken during the recording;

performing the automatic correction of the video, comprising:

determining, by the processor of the mobile device, a baseline alignment for the video recorded by the video recording device of the mobile device; and adjusting, by the processor of the mobile device, the video recorded by the video recording device of the mobile device in view of the baseline alignment, wherein the adjusting comprises automatically adjusting one or more of the plurality of image frames in the video to the baseline alignment to correct shaking; and presenting the user interface providing a playback of a preview of the adjusted video, and also providing, alongside the playback of the preview of the adjusted video, a playback of the video originally recorded by the video recording device of the mobile device.

2. The computer-implemented method of claim 1, wherein determining that the shaking of the mobile device has occurred during recording of the video comprises:

comparing a video recording device position associated with a first image frame in the video to a second video recording device position associated with a second image frame in the video.

3. The computer-implemented method of claim 1, further comprising:

determining that an orientation change of the mobile device has occurred during recording of the video, wherein the orientation change is determined for the video based on data stored by the video recording device in each of the plurality of image frames of the video, the data comprising orientation information of a corresponding image frame of the video.

4. The computer-implemented method of claim 3, further comprising:

determining a standard orientation for the video, the standard orientation being determined based on a most common orientation detected throughout the video, and one or more parameters of a video player to present the video.

5. The computer-implemented method of claim 4, further comprising:

adjusting the video to the standard orientation.

6. The computer-implemented method of claim 5, wherein adjusting the video to the standard orientation further comprises:

determining a degree of rotation required to adjust the image frame to the standard orientation.

7. The computer-implemented method of claim 5, wherein adjusting the video to the standard orientation further comprises:

providing an interface to allow the user to adjust the video to the standard orientation.

8. The computer-implemented method of claim 5, wherein adjusting the video to the standard orientation further comprises:

automatically resizing one or more of the plurality of image frames in the video based on the standard orientation; and automatically rotating one or more of the plurality of image frames in the video to the standard orientation.

9. A non-transitory computer readable medium having instructions stored thereon, that when executed by a processor, cause the processor to perform operations comprising:

receiving, at a mobile device of a user, a video recorded by a video recording device of the mobile device of the user, the video comprising a plurality of image frames;

determining, at the mobile device, that shaking of the mobile device has occurred during recording of the video by the video recording device of the mobile device, wherein the shaking is determined for the video based on data stored by the video recording device of the mobile device for the plurality of image frames of the video recorded by the video recording device of the mobile device, the data comprising position information for a corresponding image frame of the video recorded by the video recording device of the mobile device, the position information being indicative of shaking;

notifying the user of the shaking of the mobile device that occurred during the recording of the video;

receiving, via a user interface, a user request to initiate an automatic correction of the video that was recorded by the video recording device of the mobile device that was shaken during the recording;

performing the automatic correction of the video, comprising:

determining, at the mobile device, a baseline alignment for the video recorded by the video recording device of the mobile device; and adjusting, at the mobile device, the video recorded by the video recording device of the mobile device in view of the baseline alignment, wherein the adjusting comprises automatically adjusting one or more of the plurality of image frames in the video to the baseline alignment to correct shaking; and presenting the user interface providing a playback of a preview of the adjusted video, and also providing, alongside the playback of the preview of the adjusted video, a playback of the video originally recorded by the video recording device of the mobile device.

10. The non-transitory computer readable medium of claim 9, wherein determining that the shaking of the mobile device has occurred during recording of the video comprises:

comparing a video recording device position associated with a first image frame in the video to a second video recording device position associated with a second image frame in the video.

11. The non-transitory computer readable medium of claim 9, wherein the operations further comprise:

determining that an orientation change of the mobile device has occurred during recording of the video, wherein the orientation change is determined for the video based on data stored by the video recording device in each of the plurality of image frames of the video, the data comprising orientation information of a corresponding image frame of the video.

12. The non-transitory computer readable medium of claim 11, wherein the operations further comprise:

determining, by the processor, a standard orientation for the video, the standard orientation being determined based on a most common orientation detected throughout the video, and one or more parameters of a video player to present the video.

13. The non-transitory computer readable medium of claim 12, wherein the operations further comprise:

adjusting the video to the standard orientation.

14. The non-transitory computer readable medium of claim 13, wherein adjusting the video to the standard orientation further comprises:

determining a degree of rotation required to adjust the image frame to the standard orientation.

15. The non-transitory computer readable medium of claim 13, wherein adjusting the video to the standard orientation further comprises:
providing an interface to allow the user to adjust the video to the standard orientation.

16. A system comprising:
a memory; and
a processing device, coupled to the memory, to:
receive, at a mobile device of a user, a video recorded by a video recording device of the mobile device of the user, the video comprising a plurality of image frames;
determine, at the mobile device, that shaking of the mobile device has occurred during recording of the video by the video recording device of the mobile device, wherein the shaking is determined for the video based on data stored by the video recording device of the mobile device for the plurality of image frames of the video recorded by the video recording device of the mobile device, the data comprising position information for a corresponding image frame of the video recorded by the video recording device of the mobile device, the position information being indicative of shaking;
notify the user of the shaking of the mobile device that occurred during the recording of the video;
receive, via a user interface, a user request to initiate an automatic correction of the video that was recorded by the video recording device of the mobile device that was shaken during the recording;
perform the automatic correction of the video, wherein to perform the automatic correction of the video, the processing device is to:
determine a baseline alignment for the video recorded by the video recording device of the mobile device; and
adjust the video recorded by the video recording device of the mobile device in view of the baseline alignment, wherein the adjusting comprises automatically adjusting one or more of the plurality of image frames in the video to the baseline alignment to correct shaking; and
present the user interface providing a playback of a preview of the adjusted video, and also providing, alongside the playback of the preview of the adjusted video, a playback of the video originally recorded by the video recording device of the mobile device.

17. The system of claim 16, wherein to determine that the shaking of the mobile device has occurred during recording of the video, the processing device is to compare a video recording device position associated with a first image frame in the video to a second video recording device position associated with a second image frame in the video.

* * * * *